(12) United States Patent
Chen

(10) Patent No.: US 11,951,551 B2
(45) Date of Patent: Apr. 9, 2024

(54) POSITIONING CUTTER ASSEMBLY AND POSITIONING COLLET ASSEMBLY

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 338 days.

(21) Appl. No.: 17/464,123

(22) Filed: Sep. 1, 2021

(65) Prior Publication Data

US 2023/0062623 A1   Mar. 2, 2023

(51) Int. Cl.
    *B23B 31/113*    (2006.01)
    *B23B 31/00*    (2006.01)
    *B23B 31/20*    (2006.01)

(52) U.S. Cl.
    CPC .......... *B23B 31/113* (2013.01); *B23B 31/005* (2013.01); *B23B 31/20* (2013.01); *B23B 2231/0256* (2013.01); *B23B 2231/2005* (2013.01); *B23B 2260/10* (2013.01)

(58) Field of Classification Search
    CPC ............. Y10T 279/3406; B23B 31/113; B23B 31/005; B23B 31/20; B23B 2231/0256; B23B 2231/2005; B23B 2260/10
See application file for complete search history.

(56) References Cited

U.S. PATENT DOCUMENTS

| 4,995,768 | A | * | 2/1991 | Craft | ...................... | B23B 31/113 |
|---|---|---|---|---|---|---|
| | | | | | | 279/143 |
| 8,720,909 | B2 | * | 5/2014 | Hu | .......................... | B25B 23/12 |
| | | | | | | 81/177.85 |

FOREIGN PATENT DOCUMENTS

WO    WO-2016159483 A1 * 10/2016 ............. B23B 31/20

* cited by examiner

*Primary Examiner* — Eric A. Gates
*Assistant Examiner* — Reinaldo A Vargas Del Rio
(74) *Attorney, Agent, or Firm* — Birch, Stewart, Kolasch & Birch, LLP

(57) ABSTRACT

A positioning cutter/collet assembly has a cutter/collet and a magnetic attracting position key. The cutter/collet has a cutter/collet key seat recessed in an external annular surface thereof. The magnetic attracting position key is mounted on and magnetically attracts the cutter/collet key seat. The magnetic attracting position key has a body having a protruding rod and a magnetic attracting portion combined with the body and magnetically attracting the cutter/collet to prevent the magnetic attracting position key from separating from the cutter/collet.

1 Claim, 13 Drawing Sheets

POSITIONING CUTTER ASSEMBLY AND POSITIONING COLLET ASSEMBLY

BACKGROUND OF THE INVENTION

1. Field of the Invention

The present invention relates to a cutter holder assembly for a machining tool, and more particularly to a positioning cutter assembly and a positioning collet assembly that have structures for preventing a cutter falling.

2. Description of the Prior Art

To prevent a cutter in a cutter holder from falling out of the cutter holder, a fastener or a position key is used to fix the cutter. To fix the cutter by the fastener, the fastener is inserted into the cutter holder from an external annular surface of the cutter holder to abut against an abutting plane formed in an external annular surface of the cutter and to fix the cutter in the cutter holder. However, it is difficult for a user to confirm whether the abutting plane of the cutter is facing the fastener or not from outside of the cutter holder, which is inconvenient in use.

In addition, to fix the cutter by the position key, a key seat is formed in an external annular surface of the cutter, and a key way is formed in an internal annular surface of the cutter holder. The position key is putted on the key seat in the cutter, is inserted into the cutter holder with the cutter, and is engaged with the key seat in the cutter and the key way in the cutter holder to fix a position of the cutter relative to the cutter holder. However, the position key is only placed on the key seat in the cutter and is easily separated from the key seat in the cutter holder, and that is inconvenient to assemble the cutter.

To overcome the shortcomings, the present invention provides a positioning cutter assembly and a positioning collet assembly to mitigate or obviate the aforementioned problems.

SUMMARY OF THE INVENTION

The main objective of the present invention is to provide a positioning cutter assembly and a positioning collet assembly that can be conveniently installed in a cutter holder. A magnetic attracting position key magnetically attracts a key seat in a cutter or a collet to prevent the magnetic attracting position key separating from the cutter or the collet. Assembling convenience for a cutter holder assembly having the positioning cutter assembly or the positioning collet assembly mounted therein is enhanced.

A positioning cutter assembly in accordance with the present invention comprises a cutter and a magnetic attracting position key. The cutter has a cutter key seat recessed in an external annular surface of the cutter. The magnetic attracting position key is mounted on and magnetically attracts on the cutter key seat and has a body and a magnetic attracting portion. The body is mounted on the cutter key seat and has a protruding rod protruding from a side of the body away from the cutter. The magnetic attracting portion is combined with the body and magnetically attracts the cutter.

A positioning collet assembly in accordance with the present invention comprises a collet and a magnetic attracting position key. The collet has a first end, a second end opposite to the first end, a cutter chamber, and a collet key seat. The cutter chamber is formed in the collet and extends along a longitudinal direction of the collet from the first end of the collet. The collet key seat is recessed in an external annular surface of the collet. The magnetic attracting position key is mounted on and magnetically attracts the collet key seat and has a body and a magnetic attracting portion. The body is mounted on the collet key seat and has a protruding rod protruding from a side of the body away from the collet. The magnetic attracting portion is combined with the body and magnetically attracts the collet.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
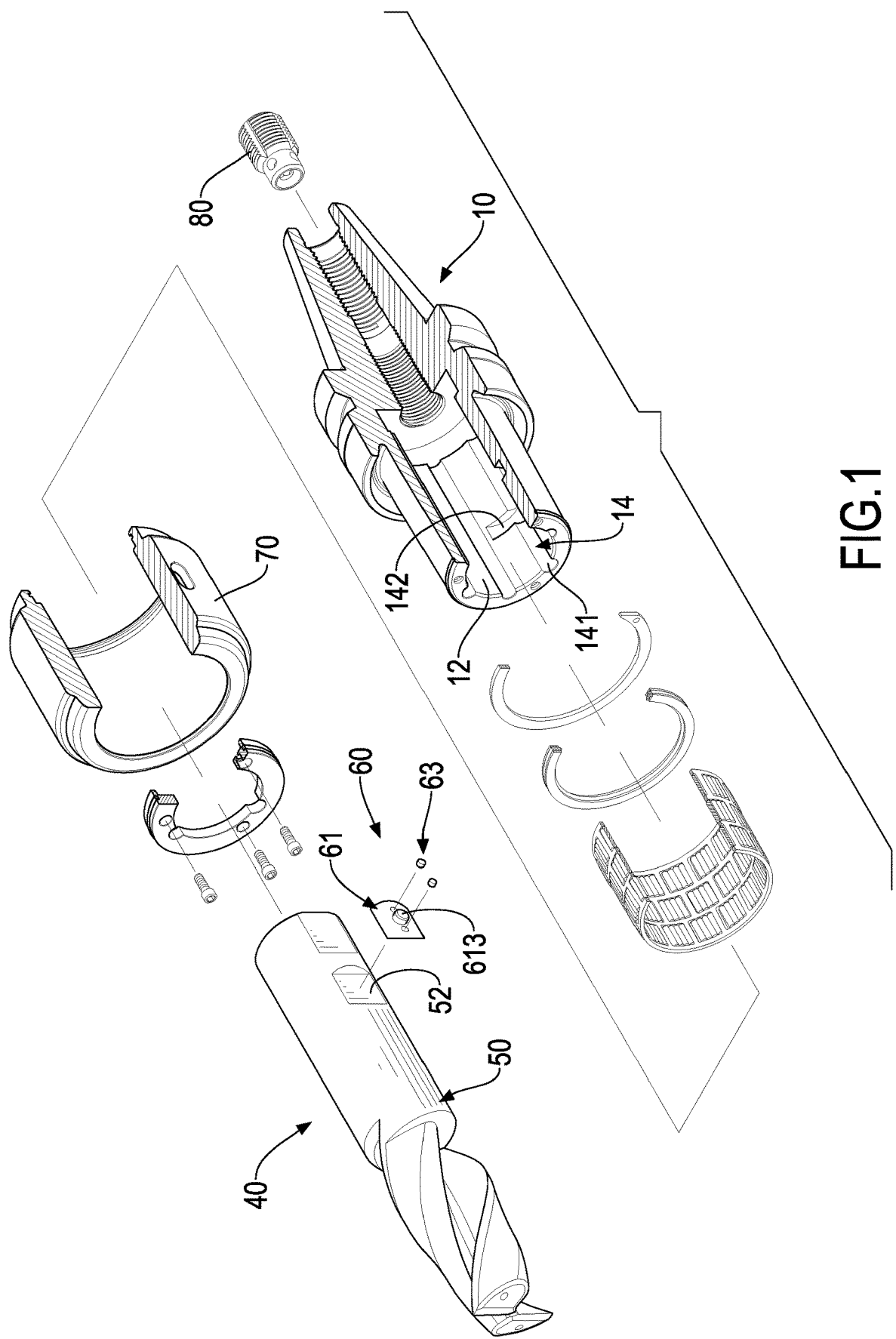
FIG. 1 is an operational exploded perspective view in partial section of a positioning cutter assembly in accordance with the present invention, showing that the positioning cutter assembly is assembled in a cutter holder assembly.
Figure 2:
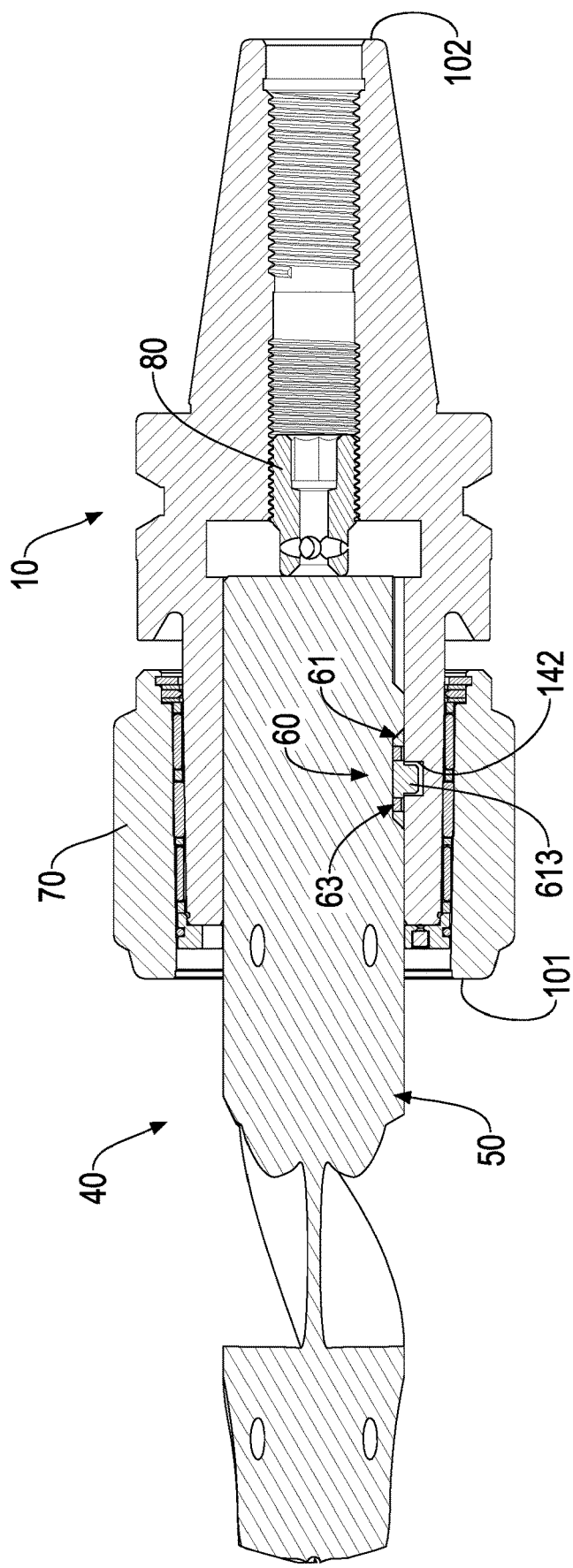
FIG. 2 is an operational cross sectional side view of the cutter holder assembly in FIG. 1.

With reference to FIGS. 1 and 2, a first embodiment of a cutter holder assembly in accordance with the present invention comprises a cutter holder 10, a cutter 50, a magnetic attracting position key 60, and a nut 70.

Figure 3:
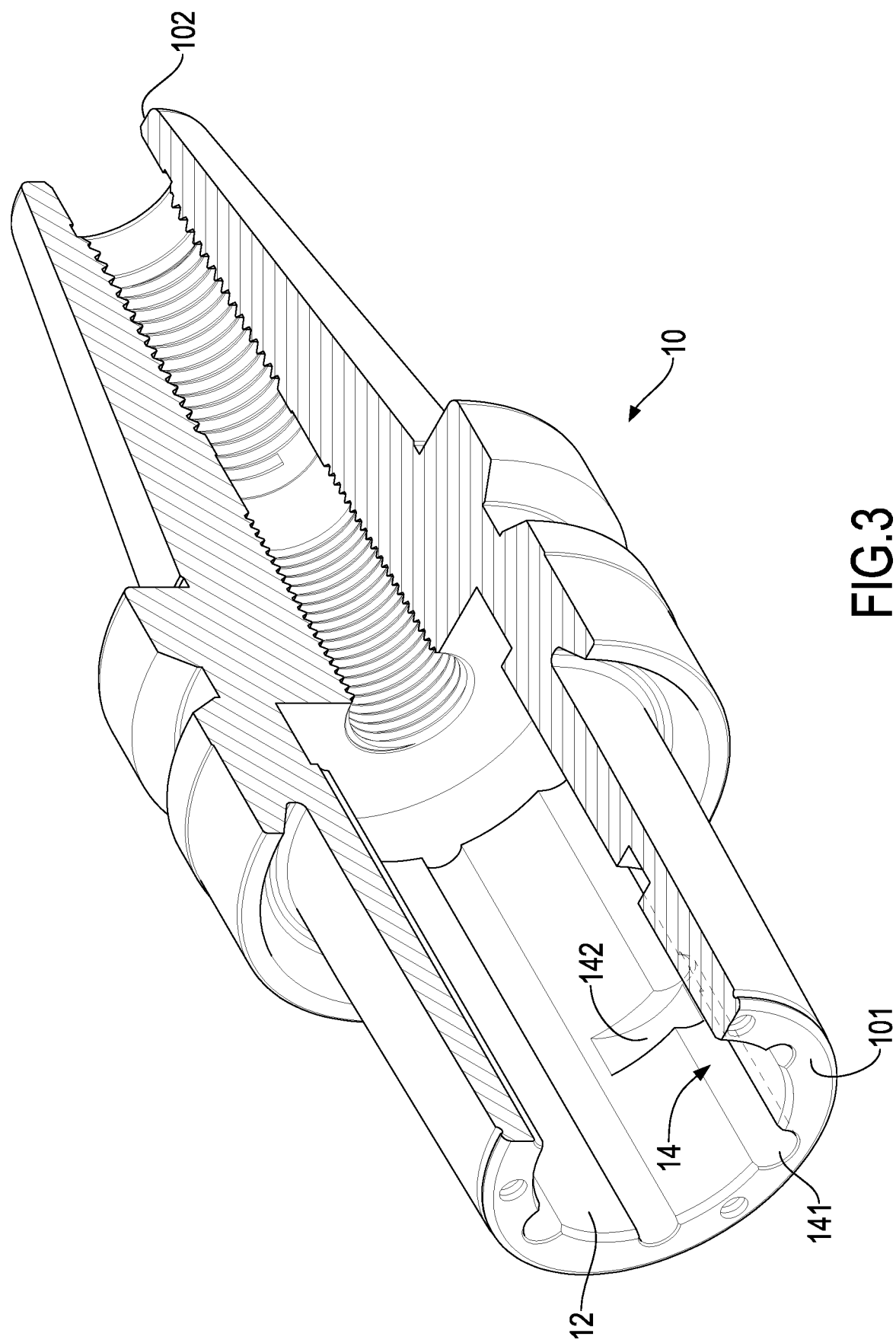
FIG. 3 is a perspective view in partial section of a cutter holder in FIG. 1.
Figure 4:
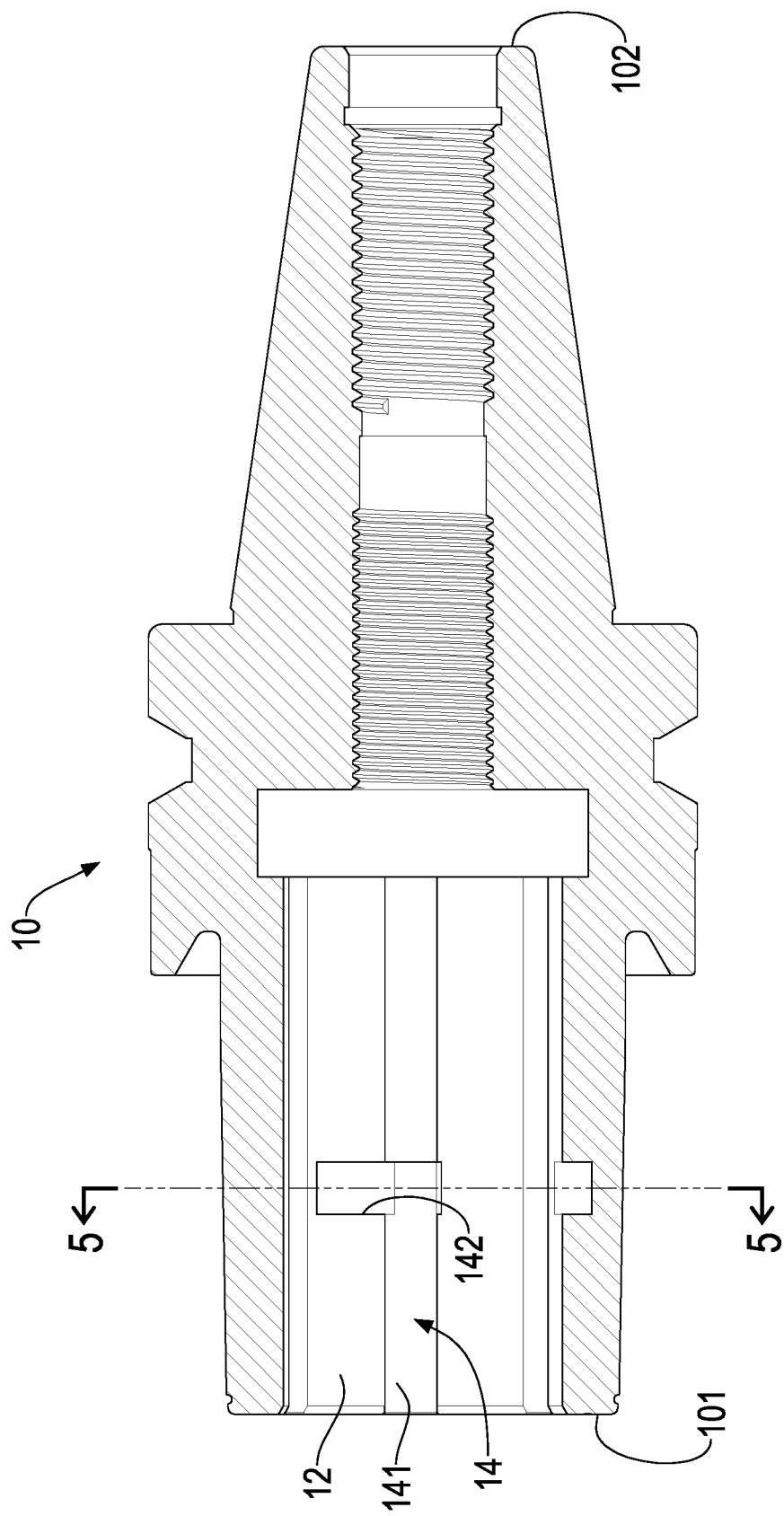
FIG. 4 is a cross sectional side view of the cutter holder in FIG. 3.
Figure 5:
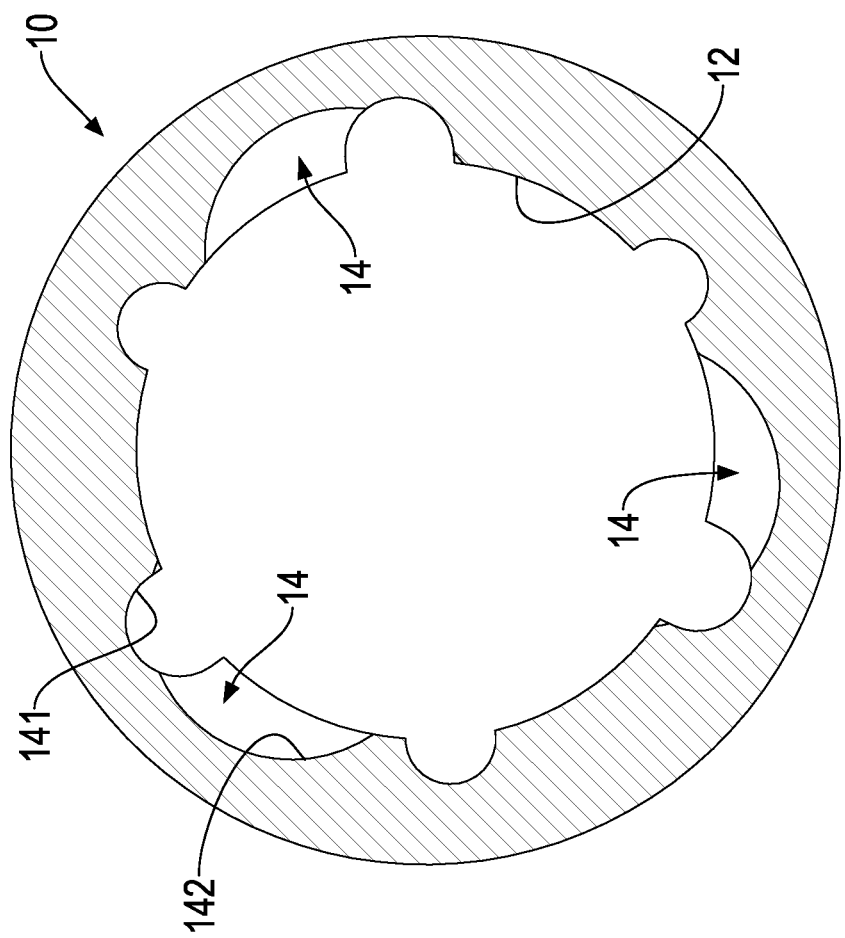
FIG. 5 is a cross sectional end view of the cutter holder along line 5-5 in FIG. 4.

With reference to FIGS. 3 to 5, the cutter holder 10 has a first end 101, a second end 102, a chamber, and a positioning groove. For the convenience of description, in the first embodiment, the chamber in the cutter holder 10 is referred to as a cutter chamber 12 and the positioning groove in the cutter holder 10 is referred to as a cutter positioning groove 14. The first end 101 and the second end 102 are respectively defined in two opposite ends of the cutter holder 10. The cutter chamber 12 is formed in the cutter holder 10 and extends along a longitudinal direction of the cutter holder 10 from the first end 101 of the cutter holder 10.

The cutter positioning groove 14 is recessed in an internal annular surface of the cutter chamber 12 and has a guiding channel 141 and a limiting groove 142. The guiding channel 141 is recessed in the internal annular surface of the cutter chamber 12 and longitudinally extends from the first end 101 of the cutter holder 10. The limiting groove 142 circumferentially extends from an end of the guiding channel 141 away from the first end 101. An angle is formed between two ends of the limiting groove 142. Preferably, multiple said cutter positioning grooves 14 are formed in the cutter holder 10 and are recessed in the internal annular surface of the cutter chamber 12 and arranged at angular intervals.

Figure 6:
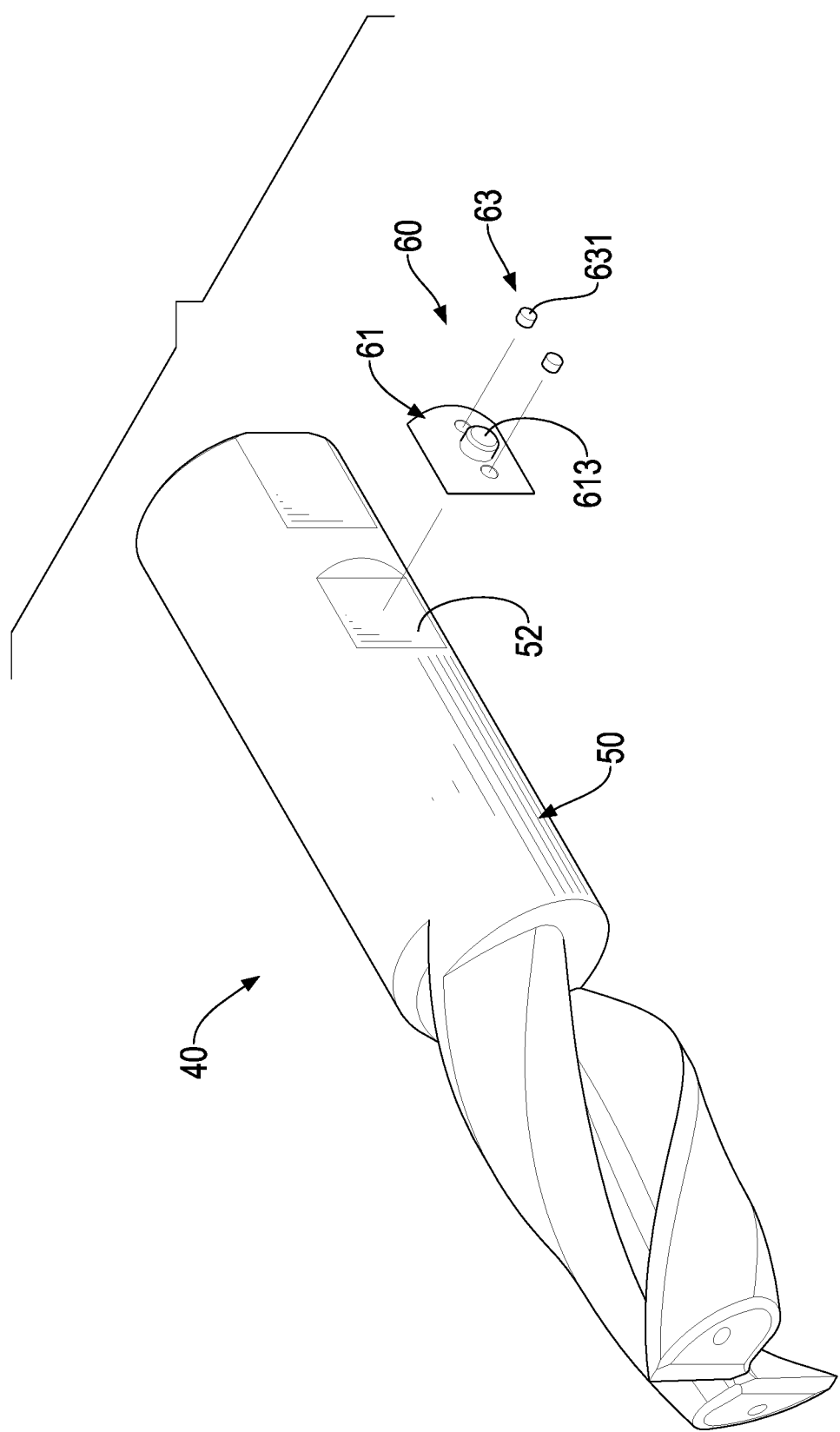
FIG. 6 is an exploded perspective view of the positioning cutter assembly in FIG. 1.

With reference to FIGS. 1 and 6, the cutter 50 has a cutter key seat 52 recessed in an external annular surface of the cutter 50. The magnetic attracting position key 60 is mounted on and magnetically attracts the cutter key seat 52 to assemble the magnetic attracting position key 60 and the cutter 50 as a positioning cutter assembly 40. The magnetic attracting position key 60 has a body 61 and a magnetic attracting portion 63. The body 61 is mounted on the cutter key seat 52 and has a protruding rod 613 protruding from a side of the body 61 away from the cutter 50. The magnetic attracting portion 63 is combined with the body 61 and magnetically attracts the cutter 50. The magnetic attracting portion 63 has two magnets 631 mounted in the body 61 and located at two opposite sides of the protruding rod 613 respectively. The magnetic attracting position key 60 magnetically attracts the cutter key seat 52 of the cutter 50 via magnetic attractions of the two magnets 631 to the cutter 50.

Figure 7:
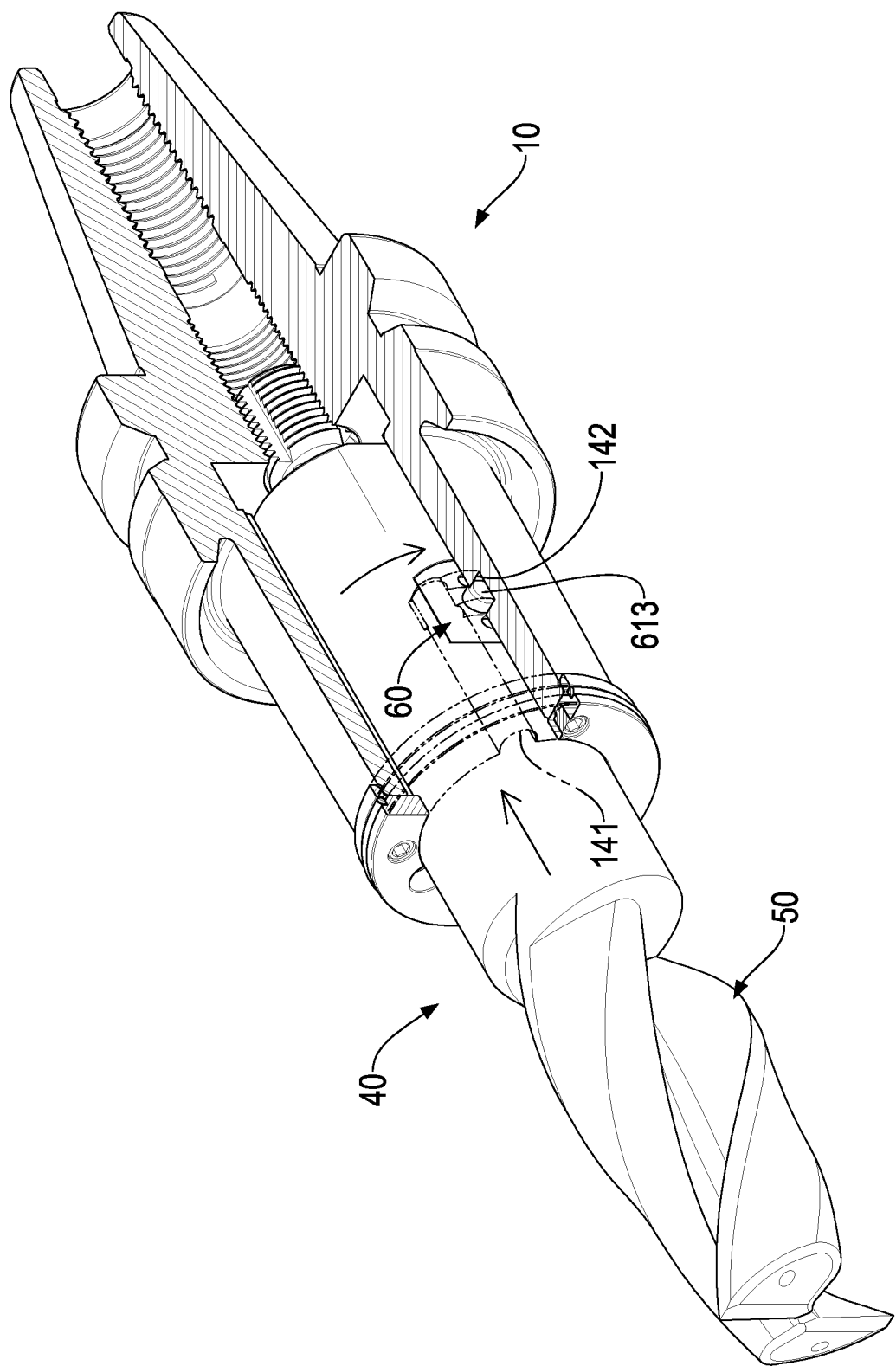
FIG. 7 is an operational perspective view in partial section of the positioning cutter assembly in FIG. 1, showing that the positioning cutter assembly is inserted in and is rotated relative to the cutter holder.
Figure 8:
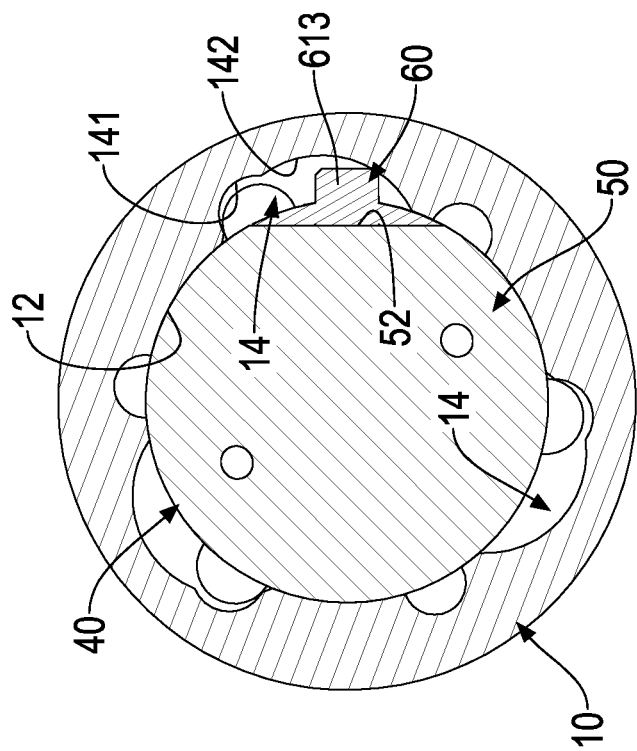
FIG. 8 is an operational cross sectional end view of the positioning cutter assembly in FIG. 1, showing that the positioning cutter assembly is rotated relative to the cutter holder.
Figure 8:
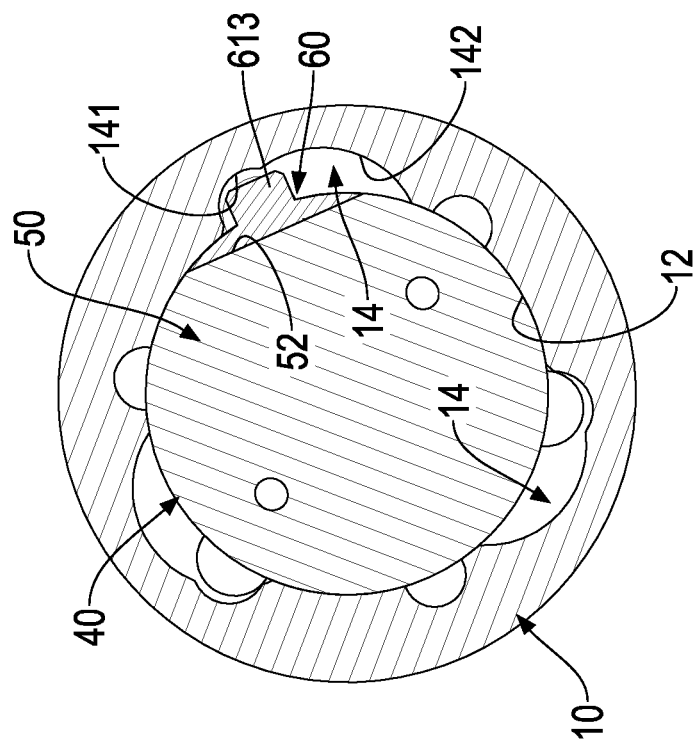

With reference to FIGS. 1 and 2, the positioning cutter assembly 40 is inserted in the cutter chamber 12, and the protruding rod 613 of the magnetic attracting position key 60 of the positioning cutter assembly 40 extends into the cutter positioning groove 14 and is engaged with the limiting groove 142 of the cutter positioning groove 14. With reference to FIGS. 7 and 8, the protruding rod 613 of the magnetic attracting position key 60 is aligned with and inserted in the guiding channel 141, and then the positioning cutter assembly 40 is inserted into the cutter chamber 12 along the guiding channel 141. After the protruding rod 613 of the magnetic attracting position key 60 abuts against the end of the guiding channel 141 away from the first end 101 of the cutter holder 10, the positioning cutter assembly 40 is rotated to turn the protruding rod 613 of the magnetic attracting position key 60 to engage with the limiting groove 142 of the cutter positioning groove 14. Accordingly, the positioning cutter assembly 40 is located at an assembly position.

With reference to FIGS. 1 and 2, the nut 70 is sleeved on and surrounds the cutter holder 10 to compress the cutter chamber 12 in the cutter holder 10. The cutter chamber 12 is flexibly deformed and is compressed to clamp the positioning cutter assembly 40. An abutting bolt 80 is screwed into the cutter holder 10. The abutting bolt 80 is connected with the cutter holder 10 via a threaded connection and abuts against an end of the cutter 50 away from the first end 101 of the cutter holder 10 to prevent the cutter 50 from rotating relative to the cutter holder 10.

Figure 9:
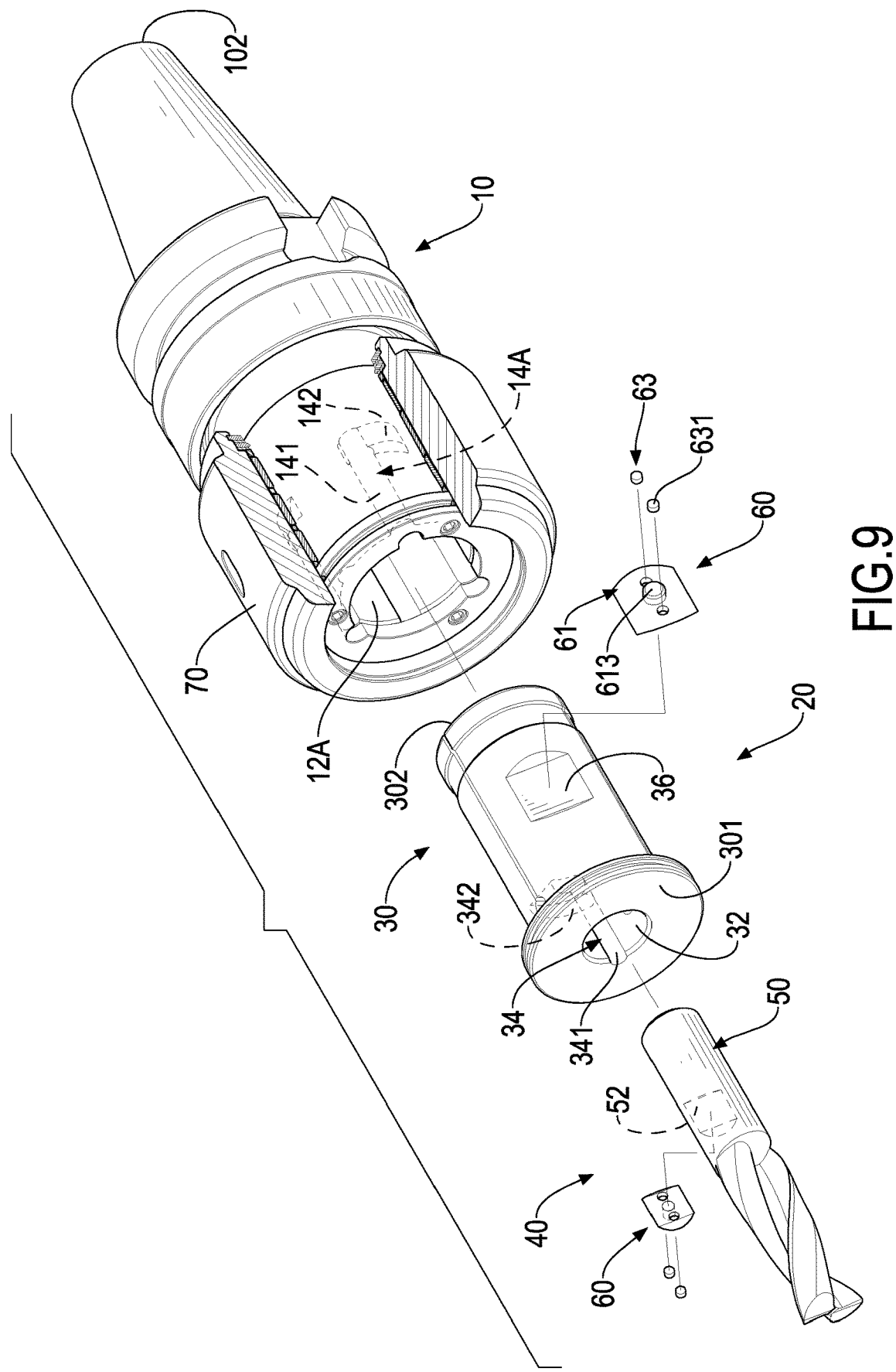
FIG. 9 is an operational exploded perspective view in partial section of a positioning cutter assembly and a positioning collet assembly in accordance with the present invention, showing that the positioning cutter assembly and the positioning collet assembly are assembled in a cutter holder assembly.
Figure 11:
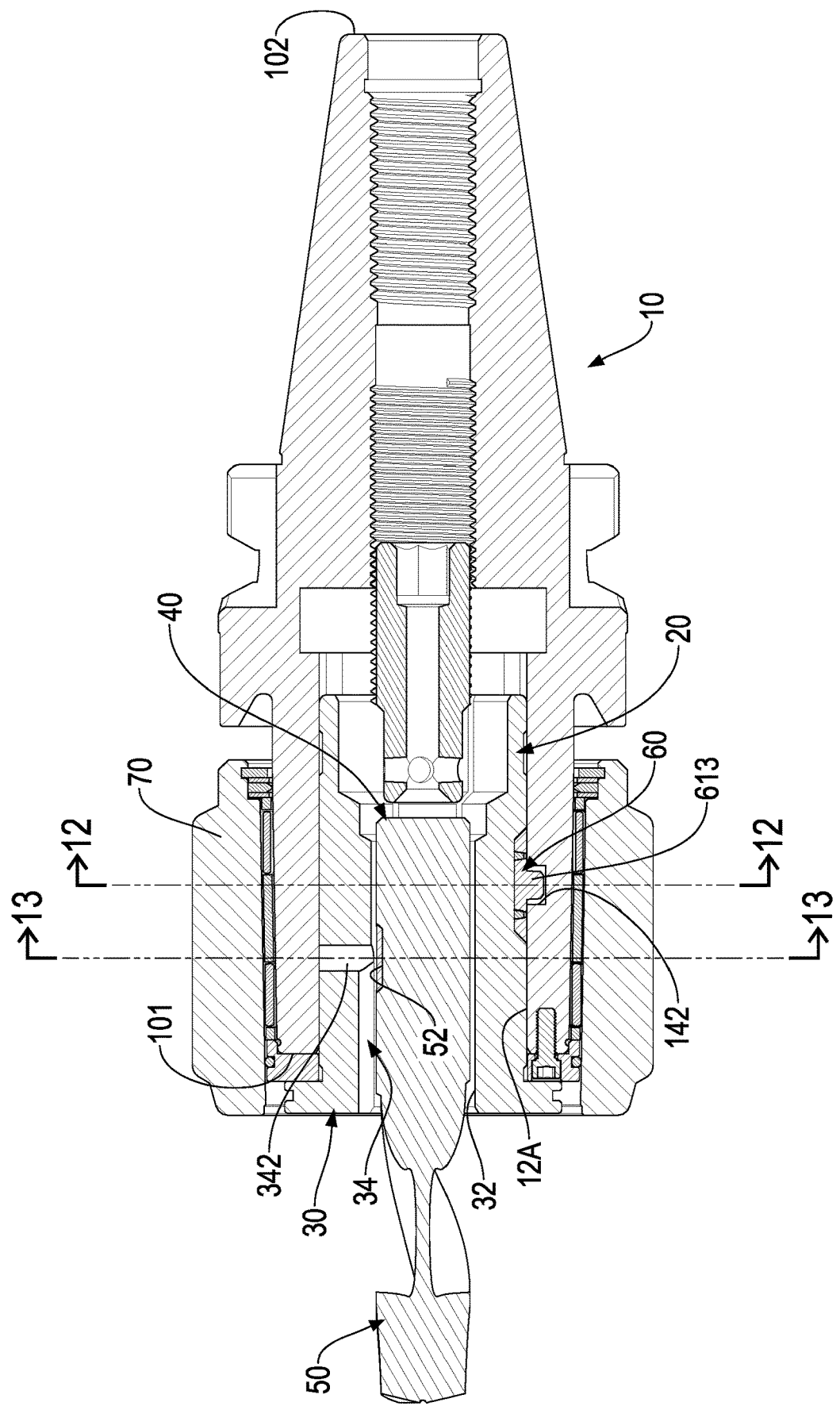
FIG. 11 is an operational cross sectional side view of the cutter holder assembly in FIG. 9, showing that the positioning cutter assembly and the positioning collet assembly are assembled in the cutter holder assembly.

With reference to FIGS. 9 and 11, a second embodiment of a cutter holder assembly in accordance with the present invention comprises a cutter holder 10, a collet 30, a cutter 50, two magnetic attracting position keys 60, and a nut 70.

The cutter holder 10 has a first end 101, a second end 102, a chamber, and a positioning groove. Structures of the cutter holders 10 of the second embodiment and the first embodiment are substantially the same. Details thereof are omitted. For the convenience of description, in the second embodiment, the chamber in the cutter holder 10 is referred to as a collet chamber 12A and the positioning groove in the cutter holder 10 is referred to as a collet positioning groove 14A. Multiple said collet positioning grooves 14A are formed in the cutter holder 10 and are recessed in the internal annular surface of the collet chamber 12A and arranged at angular intervals.

With reference to FIGS. 10 to 13, the collet 30 has a first end 301, a second end 302 opposite to the first end 301, a chamber, a positioning groove, and a collet key seat 36. For the convenience of description, in the second embodiment, the chamber in the collet 30 is referred to as a cutter chamber 32 and the positioning groove in the collet 30 is referred to as a cutter positioning groove 34. The cutter chamber 32 is formed in the collet 30 and extends along a longitudinal direction of the collet 30 from the first end 301 of the collet 30.

The cutter positioning groove 34 is recessed in an internal annular surface of the cutter chamber 32 and has a guiding channel 341 and a limiting groove 342. The guiding channel 341 is recessed in the internal annular surface of the cutter chamber 32 and longitudinally extends from the first end 301 of the collet 30. The limiting groove 342 circumferentially extends from an end of the guiding channel 341 away from the first end 301 of the collet 30. An angle is formed between two ends of the limiting groove 342. The collet key seat 36 is recessed in an external annular surface of the collet 30.

One of the two magnetic attracting position keys 60 is mounted on and magnetically attracts the collet key seat 36 to assemble the magnetic attracting position key 60 and the collet 30 as a positioning collet assembly 20. The body 61 of the magnetic attracting position key 60 is mounted on the collet key seat 36 and has a protruding rod 613 protruding from a side of the body 61 away from the collet 30. The magnetic attracting portion 63 is combined with the body 61 and magnetically attracts the collet 30.

Figure 12:
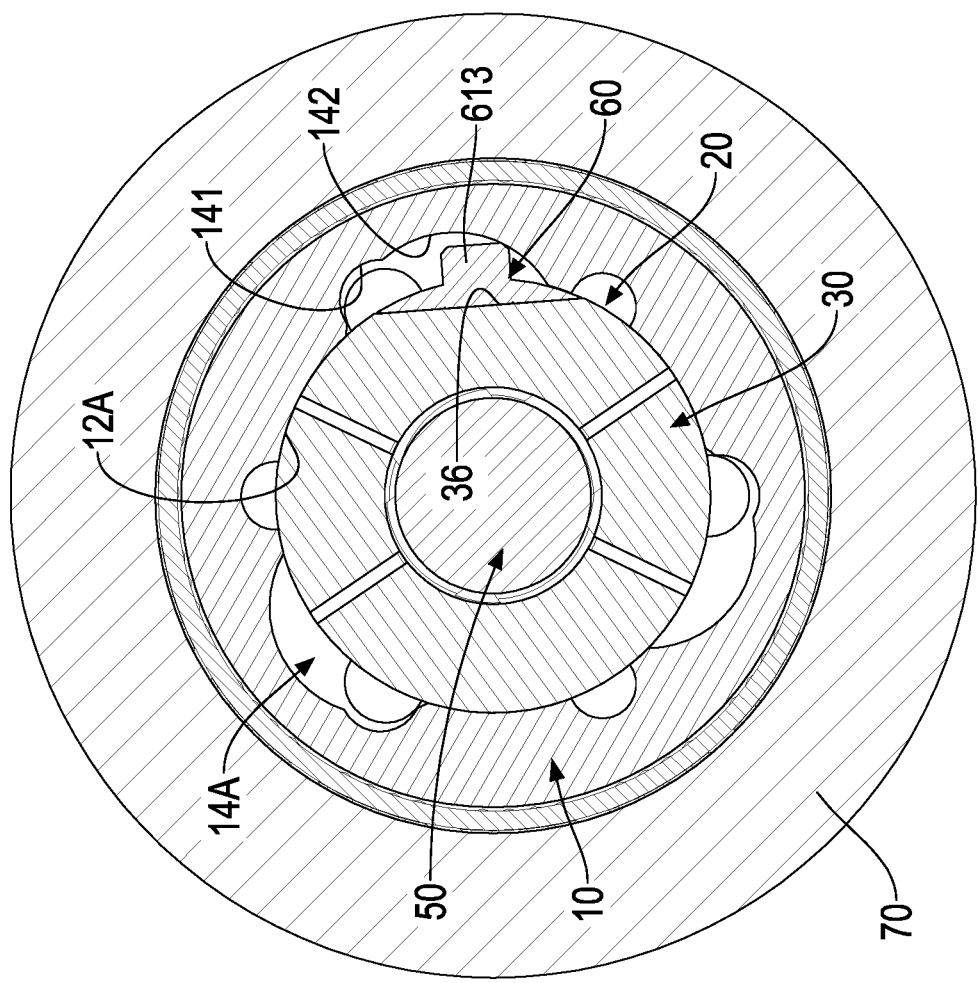
FIG. 12 is an operational cross sectional end view of the cutter holder assembly along line 12-12 in FIG. 11.

With reference to FIGS. 11 and 12, to mount the positioning collet assembly 20 in the cutter holder 10, the protruding rod 613 of the magnetic attracting position key 60 is aligned with and is inserted in the guiding channel 141 of the collet positioning groove 14A, and then the positioning collet assembly 20 is inserted into the collet chamber 12A along the guiding channel 141. After the protruding rod 613 of the magnetic attracting position key 60 abuts against the end of the guiding channel 141 away from the first end 101 of the cutter holder 10, the positioning collet assembly 20 is rotated to turn the protruding rod 613 of the magnetic attracting position key 60 to engage with the limiting groove 142 of the collet positioning groove 14A. Accordingly, the positioning collet assembly 20 is located at an assembly position.

Figure 10:
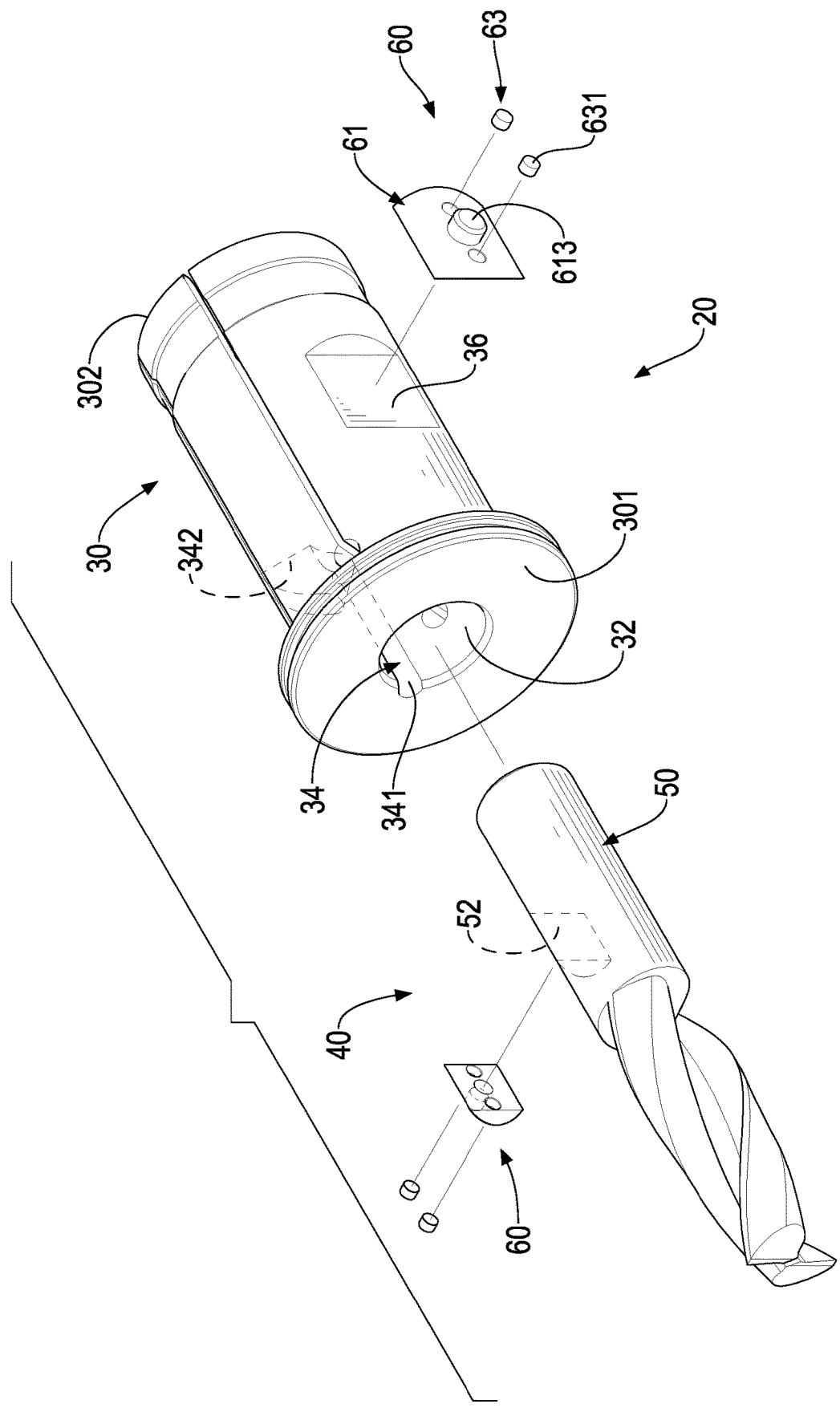
FIG. 10 is an enlarged exploded perspective view of the positioning cutter assembly and the positioning collet assembly in FIG. 9.
Figure 13:
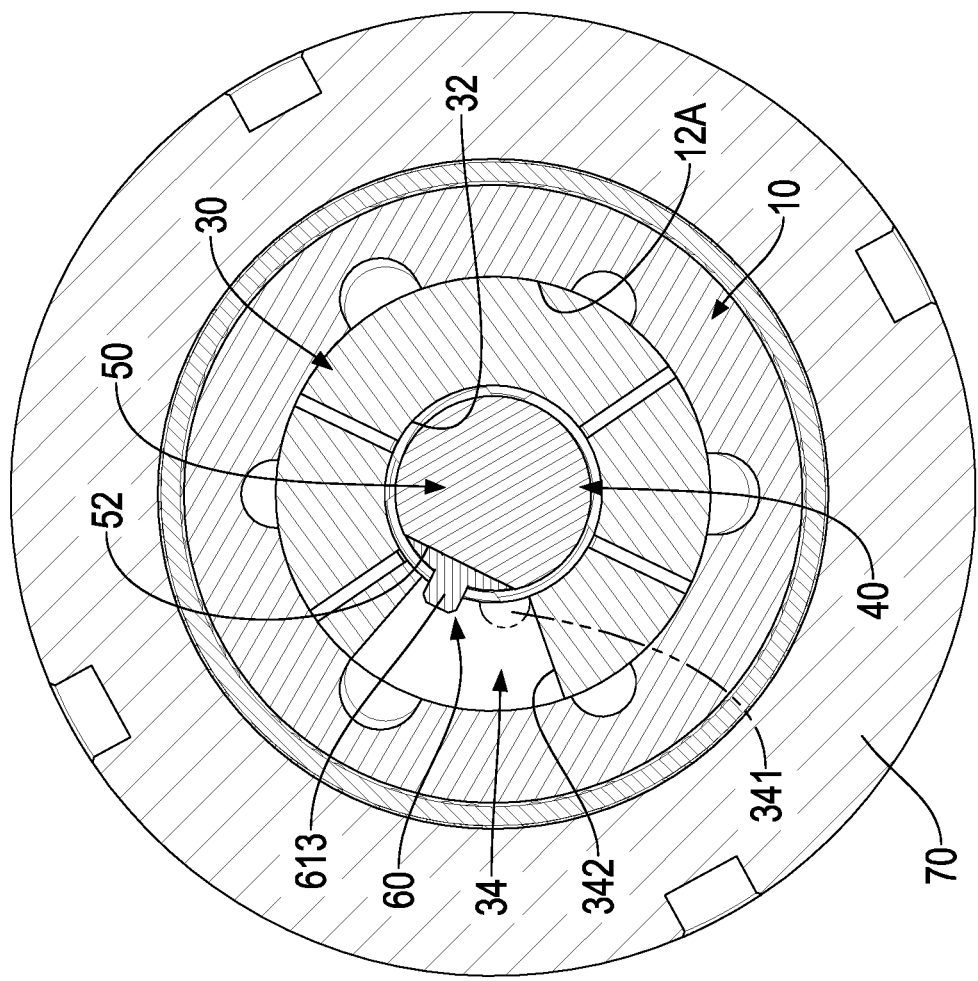
FIG. 13 is an operational cross sectional end view of the cutter holder assembly along line 13-13 in FIG. 11.

With reference to FIGS. 10, 11, and 13, the cutter 50 has a cutter key seat 52 recessed in an external annular surface of the cutter 50. The other one of the two magnetic attracting position keys 60 is mounted on and magnetically attracts the cutter key seat 52 to assemble the magnetic attracting position key 60 and the cutter 50 as a positioning cutter assembly 40. The positioning cutter assembly 40 is inserted in the cutter chamber 32, and the protruding rod 613 of the magnetic attracting position key 60 of the positioning cutter assembly 40 extends into the cutter positioning groove 34 and is engaged with the limiting groove 342 of the cutter positioning groove 34.

To mount the positioning cutter assembly 40 in the collet 30, the protruding rod 613 of the magnetic attracting position key 60 is aligned with and is inserted in the guiding channel 341 of the cutter positioning groove 34, and then the positioning cutter assembly 40 is inserted into the cutter chamber 32 along the guiding channel 341. After the protruding rod 613 of the magnetic attracting position key 60 abuts against the end of the guiding channel 341 away from the first end 301 of the collet 30, the positioning cutter assembly 40 is rotated to turn the protruding rod 613 of the magnetic attracting position key 60 to engage in the limiting groove 342 of the cutter positioning groove 34. Accordingly, the positioning cutter assembly 40 is located at an assembly 3 position.

With reference to FIGS. 9 and 10, the nut 70 is sleeved on and surrounds the cutter holder 10 to compress the collet chamber 12A in the cutter holder 10. The collet 30 is compressed to clamp the cutter 50.

In another embodiment, the holder assembly may comprise one magnetic attracting position key 60. The magnetic attracting position key 60 may be mounted on and magnetically attracts the collet key seat 36 of the collet 30 to assemble as the positioning collet assembly 20. The cutter 50 is directly mounted in the cutter chamber 32 of the collet 30 without the magnetic attracting position key 60. The magnetic attracting position key 60 may also be mounted on and magnetically attracts the cutter key seat 52 of the cutter 50 to assemble as the positioning cutter assembly 40. The collet 30 is directly mounted in the collet chamber 12A in the cutter holder 10 without the magnetic attracting position key 60.

With such arrangement, the magnetic attracting position key 60 can magnetically attract the cutter key seat 52 of the cutter 50 or the collet key seat 36 of the collet 30 by magnetic attraction force, and is prevented from separating from the cutter 50 or the collet 30. Assembling convenience can be enhanced. In addition, the positioning cutter assembly 40 or the positioning collet assembly 20 can be easily assembled in and engaged with the cutter holder 10, or the positioning cutter assembly 40 can be easily assembled in and engaged with the collet 30 via the cutter/collet positioning groove 14/14A in the cutter holder 10 or the cutter positioning groove 34 in the collet 30.

What is claimed is:

1. A positioning cutter assembly comprising:
    a cutter having a cutter key seat recessed in an external annular surface of the cutter; and
    a magnetic attracting position key mounted on and magnetically attracting the cutter key seat and having
        a body mounted on the cutter key seat and having a protruding rod protruding from a side of the body away from the cutter; and
    a magnetic attracting portion combined with the body and magnetically attracting the cutter;
    wherein the magnetic attracting portion has two magnets mounted in the body and located at two opposite sides of the protruding rod respectively.

* * * * *